United States Patent [19]

Rajamannan

[11] Patent Number: 5,622,123
[45] Date of Patent: Apr. 22, 1997

[54] PROCESS AND APPARATUS FOR KILLING SOIL PATHOGENS

[75] Inventor: A.H.J. Rajamannan, Minneapolis, Minn.

[73] Assignee: Aqua Heat Technology, Inc., Minneapolis, Minn.

[21] Appl. No.: 513,206

[22] Filed: Aug. 10, 1995

[51] Int. Cl.$^6$ ............................................. A01C 7/08
[52] U.S. Cl. .......................... 111/120; 111/118; 47/1.44
[58] Field of Search .................................. 111/113, 200, 111/178, 100, 127, 130, 901; 47/56, 1.44, 2 R; 126/271.1

[56] References Cited

U.S. PATENT DOCUMENTS

| | | | |
|---|---|---|---|
| 3,818,711 | 6/1974 | Condo et al. | 61/50 |
| 3,970,012 | 7/1976 | Jones, Sr. | 111/118 |
| 4,023,507 | 5/1977 | Van Der Lely | 111/118 |
| 4,033,270 | 7/1977 | Bezzerides et al. | 111/118 |
| 4,285,774 | 8/1981 | Rajamannan | 202/154 |
| 4,538,531 | 9/1985 | Wong | 111/118 |
| 4,565,647 | 1/1986 | Llenado | 252/354 |
| 4,941,991 | 7/1990 | Rajamannan | 252/189 |
| 5,259,327 | 11/1993 | Thompson, Jr. et al. | 111/118 |
| 5,260,341 | 11/1993 | Rajamannan | 514/675 |
| 5,287,818 | 2/1994 | Rajamannan | 111/200 X |
| 5,357,883 | 10/1994 | Depault | 111/118 |
| 5,430,970 | 7/1995 | Thompson et al. | 47/1.5 |
| 5,433,758 | 7/1995 | Thompson et al. | 47/58 |

*Primary Examiner*—Terry Lee Melius
*Assistant Examiner*—Victor Batson
*Attorney, Agent, or Firm*—Herman H. Bains

[57] ABSTRACT

A process and apparatus for sterilizing soil includes an implement including a plurality of subsurface tools having hot water nozzles mounted thereon and connected to a source of hot water. Hot water is injected into the top layer of soil as the implement is moved over a field. Stirrer tools are mounted on the implement rearwardly of the subsurface tools and extend into the ground for mixing the soil and hot water to thereby provide a uniform temperature to the soil. A foam applying system applies an insulating foam to the surface of the soil immediately after the injection of hot water into the soil.

4 Claims, 1 Drawing Sheet

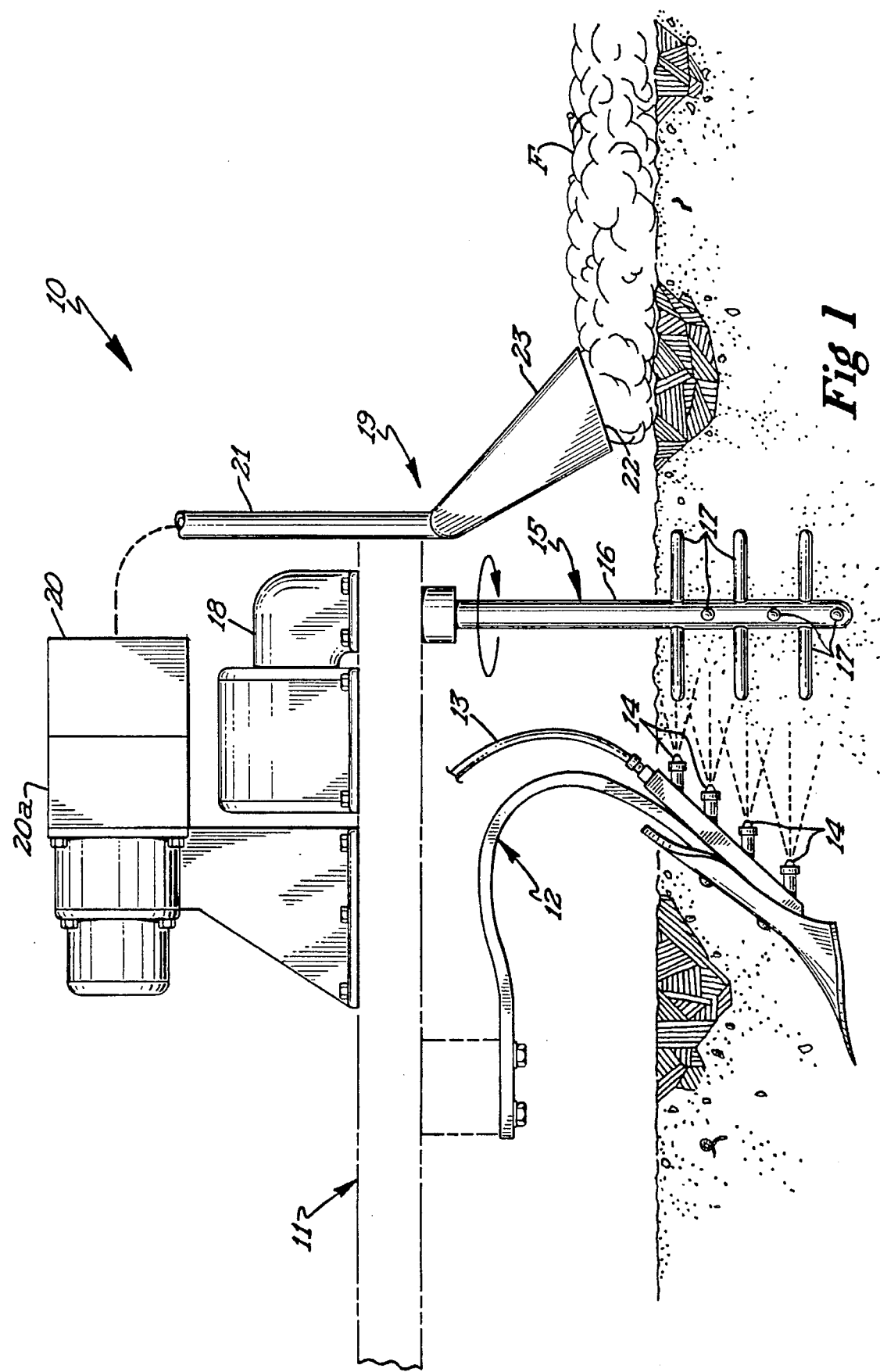

PROCESS AND APPARATUS FOR KILLING SOIL PATHOGENS

FIELD OF THE INVENTION

This invention relates to a process and apparatus for sterilizing soil through the use of hot water and foam.

BACKGROUND OF THE INVENTION

The injection of hot water into the top layer of soil for controlling nematodes and other pathogenic organisms is disclosed in U.S. Pat. No. 5,259,327. It has been found that under certain conditions, the treated top layer of soil tends to cool rapidly due to exposure to the surrounding air. Needless to say, the cooling effect is more rapid during periods when the air temperature is cool and/or when it is raining. If the soil cools down too quickly after treatment, the desired effect, control of pathogenic organisms and especially weed seeds, may not be achieved.

SUMMARY OF THE INVENTION

It is an object of this invention to provide a method and apparatus for killing soil pathogens by first applying hot water to the top layer of soil and then applying foam to the surface of the treated soil. The foam serves as a thermal layer and prevents cooling of the hot water injected into the soil. Since the heat is retained in the upper layer of soil, the pathogenic organisms including nematodes and weed seeds will be destroyed.

The apparatus used in carrying out the novel method includes an implement having subsurface tools including spring type shovels and provided with discharge nozzles for discharging hot water into the soil such as that shown in U.S. Pat. No. 5,259,327. A foam dispenser is positioned rearwardly of the subsurface tools and disperses foam over the surface of the treated soil to prevent rapid dissipation of heat from the soil.

BRIEF DESCRIPTION OF THE FIGURE OF THE DRAWINGS

FIG. 1 is a diagrammatic and side elevational view of the novel apparatus used in carrying out the novel method.

DESCRIPTION OF THE PREFERRED EMBODIMENT

The present process uses hot water which is injected into the soil to kill pathogenic organisms such as nematods, wire worms, cut worms, fungal and bacterial pathogens, weed seeds and similar pests residing in the soil to thereby improve agricultural production of the field. A hot water system for carrying out this method is disclosed in U.S. Pat. No. 5,259,327 and the present apparatus and method use the same or similar type hot water system for killing soil borne organisms. A soil conditioning agent is preferably used to treat the soil in order to render the hot water injection step more effective. A soil conditioning agent of the types disclosed in U.S. Pat. No. 5,259,327 may be used in the present process and the disclosure of U.S. Pat. No. 5,259,327 incorporated by reference herein.

The hot water which is injected into the soil is preferably heated to a temperature within the range of 100° F. to 210° F. The water will also be discharged from the nozzles with sufficient pressure to penetrate the soil and it is preferred that the pressure of injection of the hot water be within the range of 50 psi to 30,000 psi.

Referring now to the drawings, it will be seen that an agricultural implement, designated generally by the reference numeral 10, is thereshown and is used to till and treat the soil to kill the soil borne organisims. The implement 10 is preferably of the towed type and includes a frame 11 which supports a plurality of subsurface tools 12 which are in the form of spring shank shovels. Although not shown in the drawings, the implement will be provided with ground engaging wheels which are adjustable in the usual fashion to varying the depth of penetration of the soil by the tools 12.

The shovels 12 are connected by spring shanks to the tool frame 11 in the embodiment shown. A plurality of the shovels will be supported on the tools frame 11 and one of a plurality of elongate conduits 13 will be associated with each shovel and will be connected to a source of hot water under pressure and to a plurality of vertically spaced apart nozzles 14 mounted on each tool shank. The source of hot water (not shown) will include a motor pump to permit the hot water to be pumped from a reservoir through a suitable manifold and to the conduits 13. The source of hot water may also include a heating system which continuously heats the water before it is applied by the pump to the conduits 13.

The hot water will be discharged under pressure into the top layer of the soil through the discharge nozzles 14. In order to assure effective sterilization and uniform heating of the top layer of soil, a plurality of soil stirrer tools 15 are positioned immediately rearwardly of subsurface tools 12. Each stirrer tool includes a rotary vertical shaft 16 having a plurality of horizontal tines secured thereto and projecting therefrom. It will be noted that the tines 17 are arranged in vertically spaced apart relation. The stirrer tools 15 are driven by a motor/gear transmission system 18. It will be appreciated that the motor may be electric or hydraulic and the output shaft will be connected rear via a gear reduction and transmission system to all of the stirrer tools to provide the rotary power for stirring the soil. It is also pointed out that the stirrer tools may be arranged in offset relation with respect to each shovel 12 or may be positioned directly behind the shovels in tandem relation.

Foam F is applied to the surface of the ground being treated by a foam applying system 19 which is also positioned directly behind the subsurface tools 12. The foam applying system includes a foam motor-pump generator 20A and a reservoir 20 which is connected to a discharge conduit 21 that terminates in a foam outlet member 23 having a downwardly facing outlet opening 22 spaced above the surface of the soil. The foam applying system 19 will apply a blanket of foam upon the surface of the soil immediately after the hot water has been injected into the soil. The foam will therefore prevent rapid dissipation of heat into the surrounding air. In this regard, the foam serves as a temporary insulating blanket to permit the hot water to effectively control the pathogenic organisms in the soil and especially weed seeds.

The foam material will be made up of of air and water using a pneumatic system and a foaming compound comprised of protein, oils, fatty acids or surfactants. Foaming protein compounds include gelatins, alpha soybean protein solution, methyl celluloses, gum arabic, humic acid, tannin and similar protein compounds. Foams produced from protein compounds are environmentally friendly.

Aqueous solutions of fatty acid using the pneumatic method of bubbling air through the solution also produces stable effective foams. Fatty acids such as lactic, formic, acetic, propionic, butyric, valeric, hexanoic, octanoic and nonanoic acids are capable of producing foaming fatty acids.

These foams are non-toxic to the environment and to humans.

Various oils can also be used with air and water in a pneumatic method of making foams and include mixtures of vegetable oils such as linseed, olive, peanut and cottonseed oils are especially effective especially when used with a foaming agent. These oil foams do not present an environmental problem.

The foam material may also be used with air, water and a suitable surfactant including a number of commercial surfactants.

During operation of the apparatus, the agricultural implement will be moved through the field to be treated and the tools 12 carrying the nozzles 14 will be moved below the surface of the soil as hot water in excess of 100° F. is continuously injected into the soil. The stirrer tools 15 will agitate the soil which has been injected with the hot water to thoroughly contact the soil particles with hot water and increase the probability of the hot water contacting and killing soil pathogens. The mixing effect of the stirrer tools also causes uniform heating of the top layer (1 to 4") of soil. The foam will be applied to the surface of the treated soil immediately after the injection of hot water and will serve as an insulating blanket to prevent rapid dissipation of heat from the soil for a sufficient period of time to control pathogenic organisims and weed seeds. The composition of the foam is non-toxic and is environmentally friendly and presents no residual damage to the environment or any toxic effects to humans.

It will therefore be seen that I have provided a novel apparatus and method of sterilization of soil by use of hot water and foam insulation. The foam will eventually dissipate and will leave no lasting residual effects. Thus it will be seen that my improved method of soil sterilization is both safe and effective for killing and controlling soil pathogens.

What is claimed is:

1. A process for killing soil pathogens in a field for the purpose of improving agricultural production of the field, comprising the steps of, providing a mobile supply of hot water under pressure, the hot water having a temperature within the range of 100° F. to 210° F., directing the hot water under pressure to a plurality of mobile discharge media, each discharge media having a plurality of vertically spaced apart discharge outlets located at varying depths below the surface of the field to be treated, injecting the hot water from the outlets into the top layer of soil of the field at a pressure within the range of 50 psi to 30,000 psi as the mobile discharge media are moved through the field, stirring the soil immediately after injection of the hot water by subsurface rotary mixing media rotating about vertical axes for uniformly heating the soil;

producing a source of foaming material under pressure comprising water, air and a foaming compound, and applying a foam material to the surface of soil as an insulation to the top layer of soil immediately after injection of the hot water from the mobile discharge medial to prevent heat loss from the soil, whereby the pressurized hot water will penetrate the soil of the field being treated to continuously kill soil borne organisms including pathogenic organisms.

2. The process as defined in claim 1 wherein said foaming compound comprises a protein compound selected from the group consisting of gelatins, alpha soybean protein solution, methyl cellulose, gum arabic, humic acid, and tannin.

3. A mobile apparatus for killing soil pathogens in a field during movement of the apparatus for the purpose of improving agricultural production of the field, comprising, a frame, a plurality subsurface tools for tilling the soil, a plurality of discharge nozzles mounted on each tool, means for connecting the nozzles on each tool to a source of hot water under pressure, said nozzles being operable to inject hot water into the soil, a source of foaming material under pressure comprising air, water and a foaming compound, a plurality of subsurface rotary mixer tools mounted on said frame rearwardly of said subsurface tools, each of said tools being rotatable about a vertical axis and when rotated mixing the soil and hot water to provide a uniform temperature to the soil.

4. The mobile apparatus as defined in claim 3 wherein said foaming compound comprises a foaming protein compound selected from the group consisting of gelatins, alpha soybean protein solution, methyl cellulose, gum arabic, humic acid, and tannin.

* * * * *